(12) United States Patent
Poetzschke et al.

(10) Patent No.: US 6,591,293 B1
(45) Date of Patent: Jul. 8, 2003

(54) APPLICATION PRESENTATION SYNCHRONIZER

(75) Inventors: Dieter Poetzschke, North Potomac, MD (US); Frank Stein, Vienna, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/281,877

(22) Filed: Mar. 31, 1999

(51) Int. Cl.$^7$ ................................. G06F 15/16
(52) U.S. Cl. ................... 709/206; 709/224; 370/394
(58) Field of Search ............................... 709/201, 206, 709/216, 220, 204, 224, 232, 218, 203; 348/14.01, 14.03; 370/394

(56) References Cited

U.S. PATENT DOCUMENTS

| | | | |
|---|---|---|---|
| 5,303,042 A | | 4/1994 | Lewis et al. ............... 348/14.01 |
| 5,495,576 A | * | 2/1996 | Ritchey ......................... 370/10 |
| 5,537,141 A | | 7/1996 | Harper et al. ................ 725/116 |
| 5,558,339 A | | 9/1996 | Perlman ........................ 463/42 |
| 5,613,909 A | | 3/1997 | Stelovsky ....................... 463/1 |
| 5,625,404 A | | 4/1997 | Grady et al. ................. 725/114 |
| 5,654,886 A | | 8/1997 | Zereski, Jr. et al. ............. 702/3 |
| 5,659,692 A | | 8/1997 | Poggio et al. ............... 345/756 |
| 5,682,384 A | | 10/1997 | Zarros .......................... 370/394 |
| 5,916,302 A | | 6/1999 | Dunn et al. .................. 709/206 |
| 6,101,510 A | * | 8/2000 | Stone ........................... 707/513 |
| 6,167,438 A | * | 12/2000 | Yates et al. ................... 709/216 |
| 6,205,481 B1 | * | 3/2001 | Heddaya et al. ............ 709/226 |
| 6,385,642 B1 | * | 5/2002 | Chlan et al. ................. 709/203 |

FOREIGN PATENT DOCUMENTS

| | | |
|---|---|---|
| DE | 19717167.2 | 4/1997 |
| GB | 2306274 | 4/1997 |
| JP | 02-288540 | 11/1990 |
| JP | 04-60578 | 2/1992 |
| JP | 04-207381 | 7/1992 |
| JP | 06-78302 | 3/1994 |
| JP | 06326727 A | 11/1994 |
| JP | 07-284079 | 10/1995 |
| JP | 08-297624 | 11/1996 |
| JP | 09-81099 | 3/1997 |
| JP | 09-222848 | 8/1997 |
| JP | 10-124461 | 5/1998 |
| JP | 10-187614 | 7/1998 |
| JP | 2001-511561 | 8/2001 |
| WO | WO97/12447 | 4/1997 |
| WO | WO 97/37484 | 10/1997 |
| WO | WO99/05612 | 2/1999 |

OTHER PUBLICATIONS

D. Byford, "Changeable Advertising Display", IBM Technical Disclosure Bulletin, vol. 40, No. 02, Feb. 1997.

* cited by examiner

*Primary Examiner*—Ayaz Sheikh
*Assistant Examiner*—Khanh Quang Dinh
(74) *Attorney, Agent, or Firm*—Fleit, Kain, Gibbons, Gutman & Bongini P.L.; Stephen Bongini (57) ABSTRACT

A system for making presentations to audience clients in a computer network. The presentation is made by a presenter client via a Web server connected to one or more audience client units. Each audience client unit has a browser for linking to the network. The system comprises a receiver for receiving and processing page requests from at least one presenter client; a transmitter for transmitting requested pages to the presenter client; and a server siphon for intercepting composed pages and sending copies of each composed page to at least one connected audience client.

15 Claims, 5 Drawing Sheets

APPLICATION PRESENTATION SYNCHRONIZER

CROSS-REFERENCE TO RELATED APPLICATIONS

Not applicable.

BACKGROUND OF THE INVENTION

1. Field of the Invention

The invention disclosed broadly relates to the field of computer networks, and more particularly relates to the field of presentation applications for the World Wide Web (the Web).

2. Description of the Related Art

The Internet is a global network of computers and computer networks that all linked communicate by virtue of the Internet Protocol (IP). The IP is a packet-based communications protocol. In such protocols the information to be transmitted is broken up into a series of packets (i.e., sets of data) that are encapsulated in a sort of electronic envelope (the packet) including a portion called a header that includes fields for identifying the source of the transmission, the destination, and other information about the information to be delivered to the destination (called the payload). One popular form of communication that uses the Internet is to access the World-Wide Web (WWW or simply, the Web) which uses a protocol called HTTP (HyperText transfer Protocol) by client units for connecting to servers in the Web. A client unit (e.g., a microcomputer unit with a communication subsystem connected to the Internet) invokes the HTTP by simply typing a "http://" prefix with the desired Web address. Once the connection is made to the desired Web site, the user (or client) can access any document stored on that site that is available to that user. The interface used by the client is a Web browser. The browser establishes HyperText links to the subject server, enabling the user to view graphical and textual representations of information. Under the HTTP, a client obtains access to a Web site by transmitting a request (a URL) and receiving a block of data representing a Web page that is interpreted by the client's browser and rendered to the client.

As the Internet and World Wide Web become the accepted mechanism for providing services on a daily basis, more and more businesses are changing their current methods to network based processes. The Internet has become an efficient and convenient method for delivering off-line, or non-real-time, education, demonstrations, seminars, and other content involving a presenter or leader and a group of recipients. In short, a presentation is prepackaged in any one of a number formats and either static or streaming and then requested by and delivered to a client user who then plays the content. These packages allow interaction in the sense that a user may move forward and backward through the content and other more elaborate variations but, the user is limited to content contained in the package. Moreover, delivering real-time education, demonstrations, seminars or any interactive content involving a presenter and an audience over the Internet also relies on the ability of the presenter to coordinate or synchronize the content delivery with the audience; especially when the audience is made up of a large number of separate sites. Two key ingredients missing from this form of presentation are 1) interaction with the presenter and 2) the dynamic coordination between the presentation of the content and the receipt at the client.

The core of this problem is that the underlying protocol of the World Wide Web, HTTP, requires the client to initiate any transaction with a request. Coordination is awkward at best and often difficult as the presenter must somehow prompt the audience to initiate the request in a synchronized way so that the presentation achieves the impact and effect that the presenter intended. The requests are further complicated due to the entry of data that is often required in a Web application such as user-id, password, address, etc. This coordination becomes difficult if not impossible when the audience is greater than one. Each member of the audience may receive a different impression or understanding of the presentation. In the case of a sales demonstration or education performed over the World Wide Web this becomes unacceptable.

In summary, the current protocols and mechanisms of the World Wide Web are not conducive to providing a presenter complete control over the pacing, execution, and perception of their presentations. Presenters must rely on their audience to help execute a presentation of which they are necessarily ignorant. Accordingly, there is a need for a system for making presentations on the Web which overcomes the above problems.

SUMMARY OF THE INVENTION

The invention specifically addresses presentations given over the World Wide Web in which the presenter and the audience members are not physically co-located and each individual or site has access to a web browser. It is expected, although not necessary, that there be some adjunct connection, such as a telephone, to facilitate the audio presentation.

Briefly, a system according to the invention involves two primary elements. The first is a client monitor and the second is the server siphon. Each audience member has a client monitor installed in its Web browser. The presenter executes a Web application in concert with the narration. As each page is requested by the presenter and delivered to his or her browser, the server siphon intercepts the composed Web page and sends copies of it to the attached client monitors. In this way, the presenter can easily coordinate the delivery of a Web page with the narration for maximum effect.

DETAILED DESCRIPTION OF AN EMBODIMENT

Figure 1:
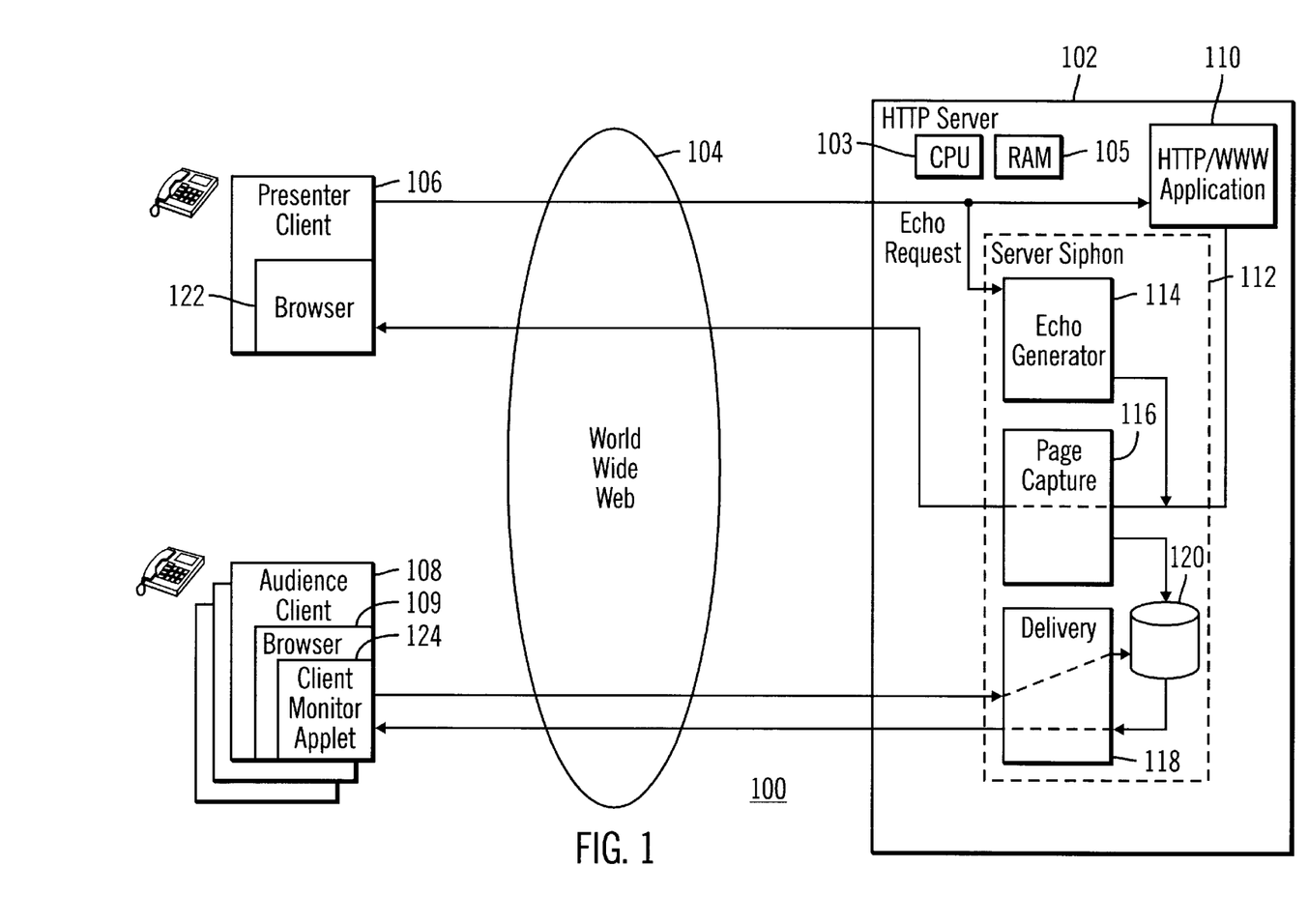
FIG. 1 is a simplified block diagram showing a system topology according to the present invention.

Referring to FIG. 1, there is shown a simplified block diagram representing the topology of a system 100 in accordance with the invention. The system 100 comprises (includes, but is not limited to) a server to the Web 104 and adapted to operate under the HTTP. The HTTP server 102 can be any commercially-available server with the required programming or specialize hardware. The architecture of such server systems is well known and hence many common components are left out for simplicity. Preferably, many of the functions required for the operation of the server 102 are performed by a CPU (central processor unit) 103 executing program instruction from a working random access memory (RAM) 105.

The system 100 further comprises a plurality of client units (e.g. personal computers) all connected to the Web 104. These client units are represented here by presenter client unit 106 and audience client units 108. In this example a single presenter uses unit 106 but it is also possible for more presenters to participate. The server 102 comprises an HTTP/WWW application program 110 for processing Web page requests from clients, and for performing other Web server functions.

The server also comprises a server siphon 112 in accordance with an aspect of the invention. The server siphon, in turn, comprises an echo generator 114, a page capture module 116, and a delivery module 118. A mass storage device (e.g., a hard disk drive) 120 is connected to receive composed Web pages from the page capture module 116 and to provide those Web pages to the delivery module 118 for delivery to the audience client 108.

The presenter client 106 is an information handling system such as a desktop computer comprising a browser program 122 (e.g. Netscape or Internet Explorer) and a client monitor 123 in accordance with an aspect of the invention. One or more audience clients 108 are coupled to the World Wide Web with a browser 109, similar to or the same as browser 122 except that the audience client receives a client monitor applet 124 that enables viewing of the Web pages delivered by the HTTP Server 102.

The system 100 specifically addresses presentations given over the World Wide Web in which the presenter and the audience members are not physically co-located and each individual or site has access to a Web browser. It is expected, although not necessary, that there be some adjunct connection, such as a telephone, to facilitate the audio presentation.

The system 100 involves two primary elements. The first is the client monitor and the second is the server siphon. Each audience member has a client monitor 124 installed in its Web browser. The presenter executes the Web application in concert with the narration. As each page is requested by the presenter and delivered to his browser, the server siphon intercepts the composed Web page and sends copies of it to the connected client monitors 124. In this way, the presenter 106 can easily coordinate the delivery of a Web page with the narration for maximum effect.

The Client Monitor

The Client Monitor 124 performs two basic operations. The first is to continually submit a generic request to a well know URL for the next page of the presentation. The second is to receive response and display it on the user's browser. As soon as a response is received, the client monitor immediately issues a request for the next page without any intervention by the user. The request is issued against a well known address of a Server Siphon associated with the presentation of interest.

The Client Monitor 124 nominally performs no processing of the Web page. It simply passes the page to the client browser. The browser 109 then renders the page as it would any other. The Client Monitor 124 is, however, ideally positioned to perform post-processing on the Web application output and, thereby, enhance the presentation. One example of such an enhancement is the ability to echo a completed form to the audience before it is submitted for normal processing by the application. Normally, the presenter and audience would be viewing a blank form. The presenter would then fill in appropriate data and submit the form for processing. The result would then be displayed to the audience. The audience, however, will not have the benefit of seeing the completed form prior to submission. This is a limitation of the HTTP protocol. The Client Monitor 124, however, is able to insert a special HTML artifact (for example, a button or link) on any form page. This artifact allows the completed form to be submitted to the Echo Generator 114 prior to submission for processing. The Echo Generator 114 modifies the original form HTML and inserts the values collected from the presenter. The modified form HTML containing the presenter's values is then sent to the audience. At that point, the presenter may submit the form for normal processing by the application.

To be generally useful, the Client Monitor 124 must be implemented on multiple platforms and for multiple browsers. Depending on the architecture of the a browser, the Client Monitor 124 may be developed as plug in module which would require the Client Monitor 124 to adhere to certain architectural requirements placed by the browser 109 on its plug-ins. The JAVA language is particularly well suited for this type of application. The Client Monitor functions are fairly simple and JAVA is easily portable to various platforms and is supported by the large majority of the a commercially available browsers. Further, browsers that support JAVA allow a JAVA application to execute as an integral part without requiring them to be plug-ins. This avoids the browser specific characteristics which limit the portability of the client.

The Server Siphon

The Server Siphon 112 performs two basic functions. The first is to capture each composed Web page resulting from the presenter's request. The second is to make the page available to all pending Client Monitor 124 requests. There are a number of mechanisms available to perform the routing of the page data. These mechanisms are well known to those familiar with this art.

The Server Siphon 124 must be integrated with the Web server in such a way that is able to capture the composed Web pages. In the majority of the Web servers commercially available, the Server Siphon would be implemented as an adjunct library accessing the server's public API (application program interface) set.

The Process Flow

Nominal Process Flow

Figure 2:
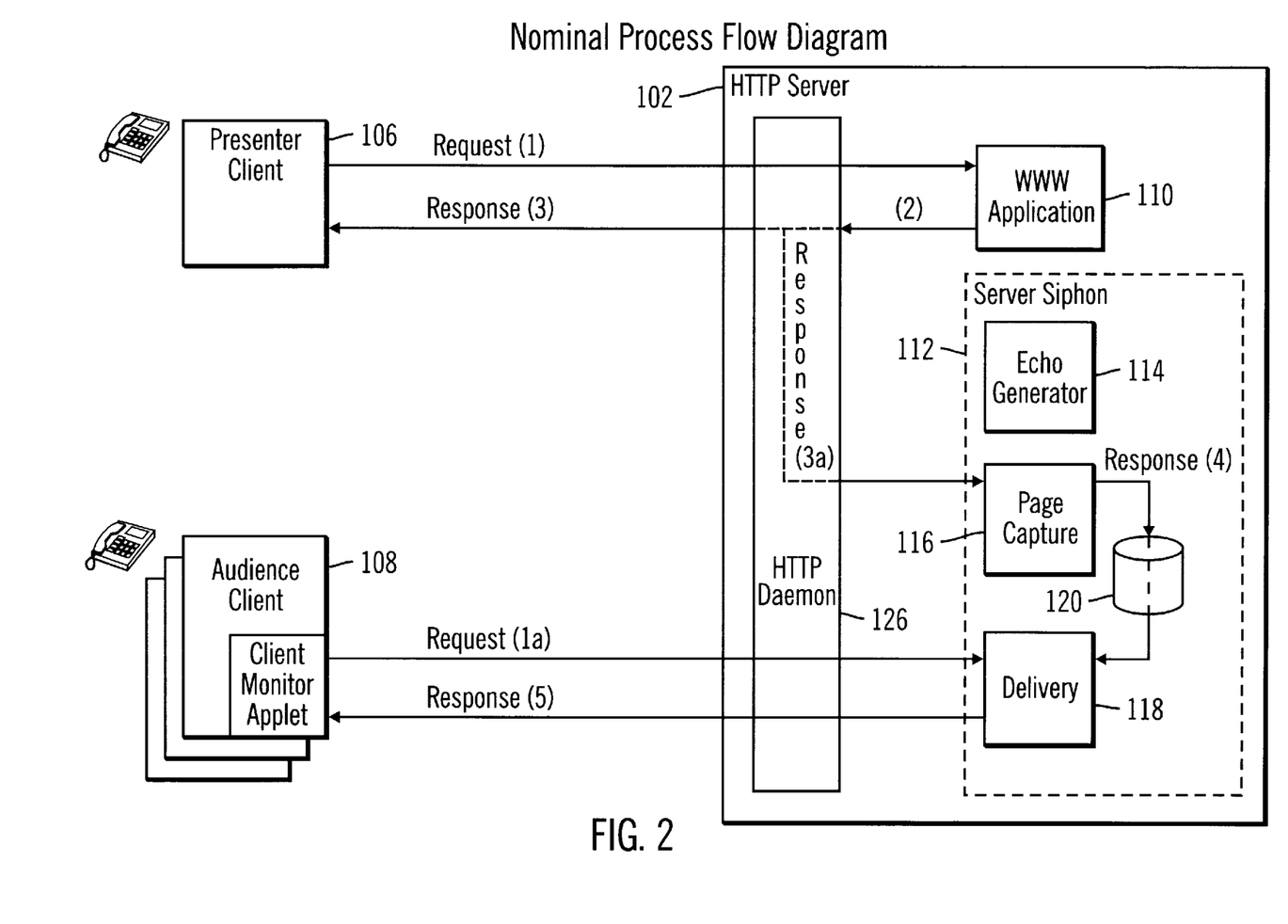
FIG. 2 is an illustration of a nominal process flow according to the present invention.
Figure 3:
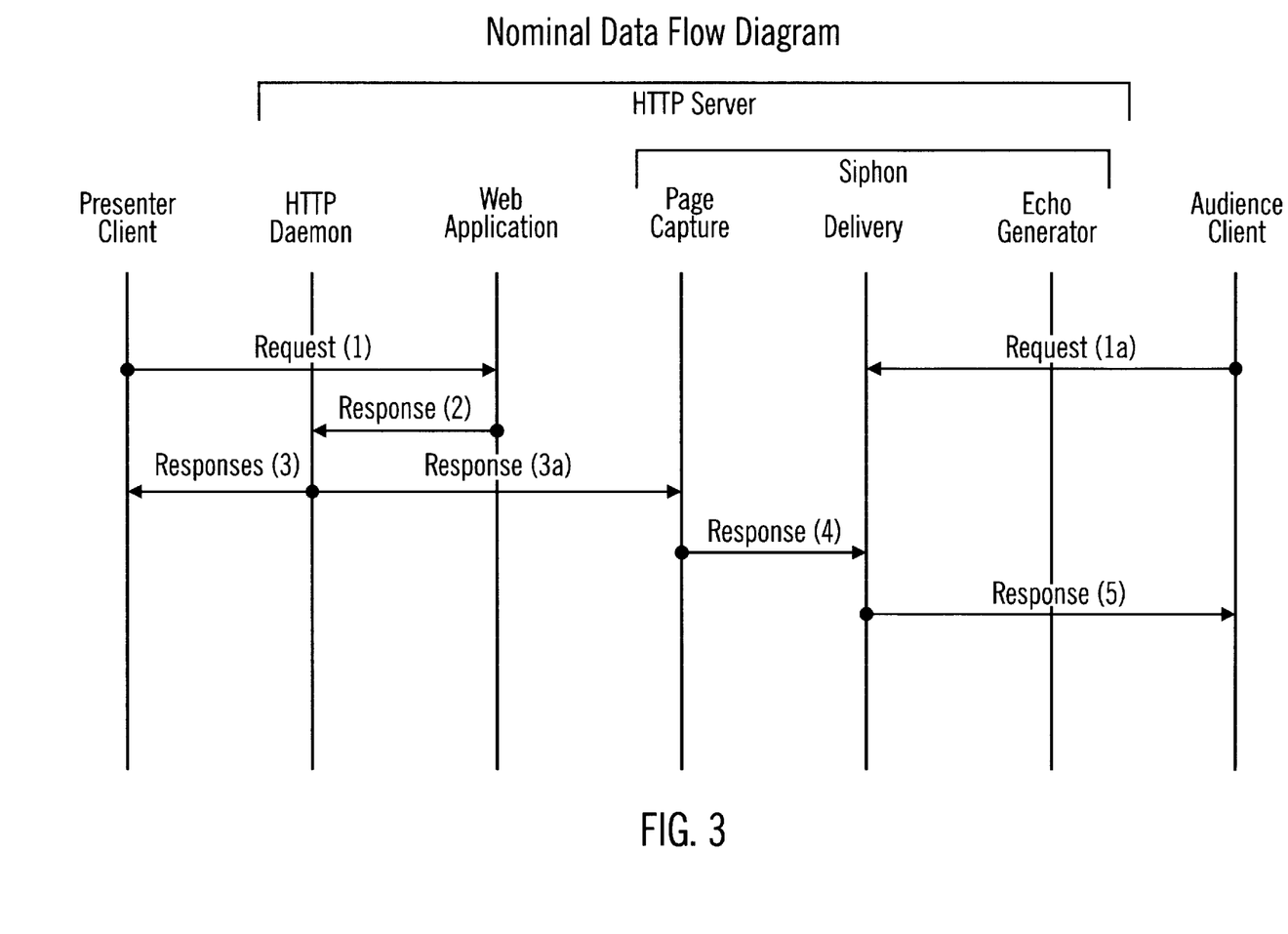
FIG. 3 illustrates the data flow associated with FIG. 2, according to the present invention.

Referring to FIG. 2, there, is shown the nominal process flow in the system 100 and FIG. 3 illustrates the associated data flow according to an aspect of the invention. FIG. 2 shows an HTTP Daemon within the HTTP server 102. The process flow involves five basic steps listed below. Each step is then described in detail.

1. HTTP Request to Server.
2. Application Response to HTTP Daemon.
3. HTTP Daemon Response delivered to presenter and captured for audience.
4. HTTP Response stored for delivery to audience.
5. HTTP Daemon Response delivered to audience.

The HTTP Request to Server (Step 1 and 1a)

Both the presenter and the audience clients must make HTTP requests to receive any data. The presenter client is the active client and drives the process in that the presenter controls the flow through the Web application. The audience client(s) is the passive client and receives the results of the presenter client's actions (requests). The audience client request is, therefore, a generic request for the next page as determined by the presenter client actions.

Step 1 involves the presenter client's request which initiates the active portion of the process flow. The presenter clients request is passed on to the application 110 by the HTTP Daemon 126 without modification to either the request or the way in which it is processed by the HTTP Daemon.

Step 1a involves the audiences request which returns the formatted output resulting from the most recent request from Step 1. The audience client's request is passed on to the Delivery feature application 118 by the HTTP Daemon 126 without modification to either the request or the way in which it is processed by the HTTP Daemon 126. These steps are asynchronous and have no dependencies on each other.

The Application Response to HTTP Daemon (Step 2)

The application 110 processes the request as it would normally and sends its response to the HTTP Daemon 126.

The HTTP Daemon Response Delivered to Presenter and Captured for Audience (Step 3 and 3a)

Step 3 The HTTP Daemon 126 returns the HTTP response to the presenter's client without modification of either the response or the HTTP Daemon processing of the request. This is somewhat of an oversimplification as the HTTP Server implementations require that the Page Capture feature take control, even if briefly. However, this "limitation" is actually an advantage as noted in the section below.

Step 3a The HTTP Daemon 126 must also redirect an unmodified copy of the HTTP Response to the Page Capture feature 116. The Page Capture feature 116 is implemented as an HTTP Daemon API 126 exit which is an available feature on the majority of the generally available commercial HTTP Servers. Examples of the API exit feature are the Netscape APIs (NSAPIs) of the Netscape servers and the Internet Connection APIs (ICAPIs) of the IBM Internet Connection Server (also used by the Lotus Domino Server).

The HTTP Response Stored for Delivery to Audience (Step 4)

The Page Capture feature 116 then passes the HTTP Response to the Delivery feature 118 for storage and delivery to the audience clients.

In order to enable the ability for an audience client to preview a form page with data as filled in by the presenter client before the form is submitted to the application for processing, the Page Capture feature 116 filters the captured pages. In the general case, each page is parsed to check if it contains a HTML form syntax. It is also possible to build the filter based on the known URL or filename of an HTML form page without having to parse each page. However, the filter is not limited to form pages—any page may be selected based on the criteria established in the filter. In any case, when the Page Capture feature 116 detects a form, it will insert an HTML artifact which will enable the presenter to echo the filled in form to the audience clients before submission to the application. The artifact will have associated with it a special URL which points to the Echo Generator 114 described as part of the Data Echo Process Flow section.

The HTML artifact is only inserted in the presenter's version of the page. The presenter then has a choice as to whether or not the audience needs to see the form before submission and in any case the audience is not distracted by the inserted artifact. Further, the original Web application does not have to be modified in order to support this feature.

The mechanisms for communication between the Page Capture 116 and Delivery 118 features can be any of the mechanisms available and known to those knowledgeable in the development of HTTP and Web Applications. Some examples are named pipes, sockets, shared memory, and files. The selection of a specific mechanism is dependent on the requirements of a particular implementation and the preferences of the developer.

The mechanisms for storage of the HTTP response can be any of the storage mechanisms available and known to those knowledgeable in the development of HTTP and Web Applications. Some examples are shared memory and files.

The HTTP Daemon Response Delivered to Audience (Step 5)

Upon the availability of an Application Response, the Delivery feature 118 sends the response via the HTTP Daemon 126 to the audience client 108

If there is no application output available, no response is sent pending the availability of output.

The Data Echo Process Flow

Figure 4:
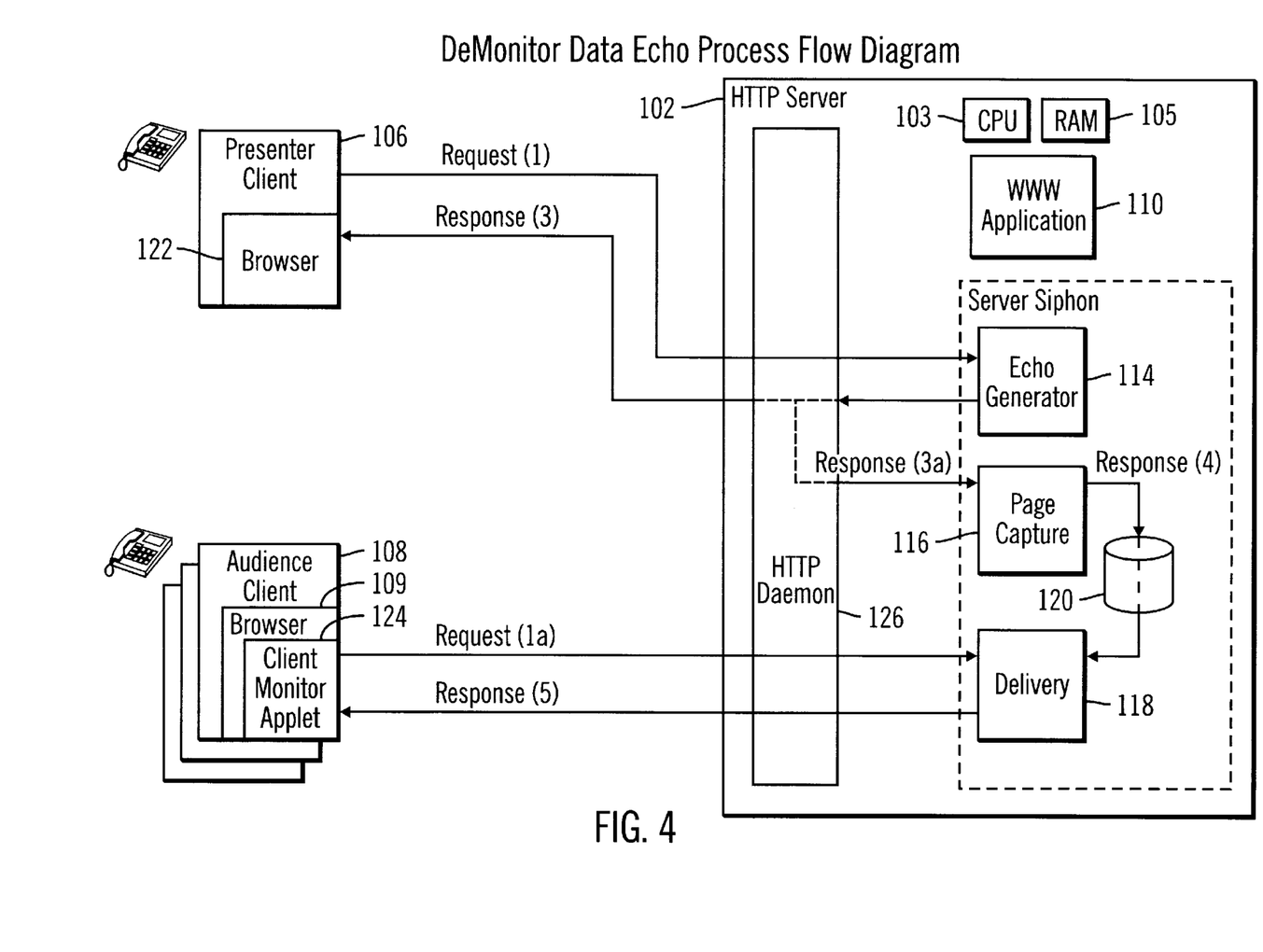
FIG. 4. illustrates the data flow for a data echo according to the present invention.
Figure 5:
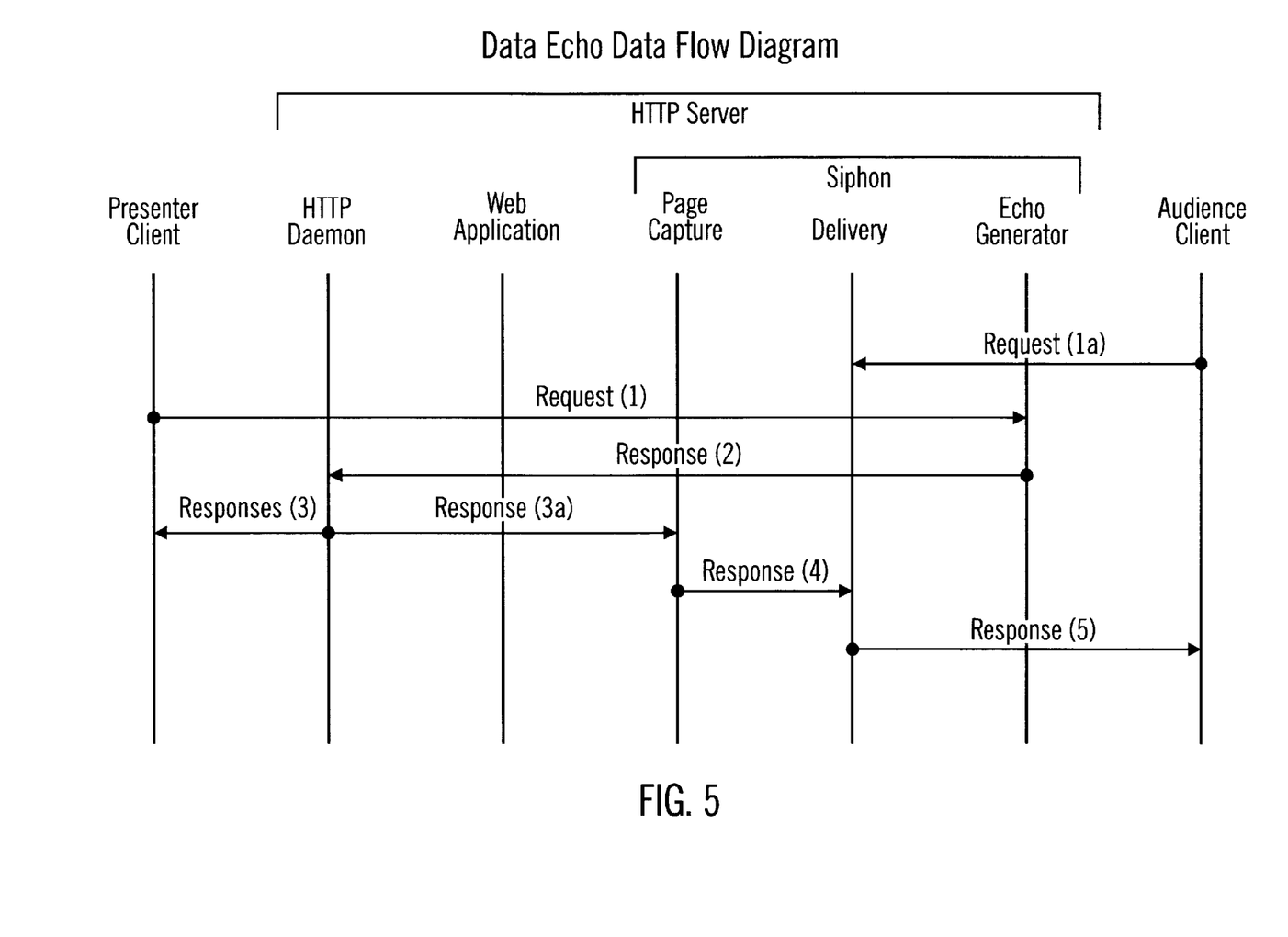
FIG. 5 illustrates the data flow associated with FIG. 4, according to the present invention.

FIG. 4 shows the process flow for data echo in system 100 and FIG. 5 illustrates the associated data flow for the invention. The Data Echo flow is executed when a presenter wishes to display to the audience client 108 a page containing data entered at the presenter's client 106 prior to processing by the application 110. This flow is similar to the Nominal Flow described in the previous section with the exception of Steps 1 and 2. Note that this flow is only possible for pages which have been processed by the Page Capture feature 116 during the process flow of a previous request. That is, the page must have been enabled to support the Data Echo flow.

The HTTP Request to Server (Step 1 and 1a)

Step 1 involves the presenter client's request which initiates the active portion of the process flow. The presenter client's request is passed on to the application 110 by the HTTP Daemon 126 without modification to either the request or the way in which it is processed by the HTTP Daemon 126. However, the URL is that of the Echo Generator feature 114. In effect, the request bypasses the Web application 110 and is passed directly to the Echo Generator 114. This redirection feature is provided by generally available commercial HTTP Servers. The HTTP Request is composed of the form name and the data that the presenter client has provided as defined for an HTML request involving a form.

Step 1a There is no change in the way the audience client 108 presents it request or in the way in which it is processed at the HTTP Server 102.

These steps are asynchronous and have no dependencies on each other.

The Echo Generator Response to HTTP Daemon (Step 2)

The Echo Generator 114 is a special purpose application. It parses the HTTP Request and retrieves the source file for the original blank form. The Echo Generator 114 then inserts the data from the presenter client 106 into the appropriate "fields" of the form. The newly modified form is then sent as a Response to the HTTP Daemon 126 and the flow continues from Steps 3 as described in the Nominal Process Flow section.

The system described above, has possible application in many scenarios including:

1. Distance Learning
2. Web Demonstrations
3. Web Application Training
4. Information Interchange While the listed example scenarios vary in specifics such as the presenter, the audience type and composition, and the objective of the Web application, they do share a common flow which is repeated throughout the presentation. This scenario flow is described below.

Step 1—Setup: The presenter arranges and coordinates the presentation much in the same way a teacher arranges a class or a salesman arranges a sales pitch. The presenter establishes a start time and notifies all interested participants. The presenter will establish an adjunct form of verbal communication with the audience members such as a conference call via a Telco or using the Internet. Each participant is informed of a URL to contact at the appropriate time via a JAVA enabled World Wide Web client browser such as the Netscape Navigator or Microsoft Internet Explorer.

Step 2—Startup: At some point in time, presumably as specified by the presenter, the audience will use their clients to connect to the specified URL. The target URL may be some form of a sign up form or contact sheet, however, at some point, the audience must be linked to the download of the Client Monitor JAVA applet. This is the starting point of the presentation. The audience will also connect with the presenter via the verbal connection although this is not a necessary prerequisite for the operation of the DeMonitor.

Step 3—Presentation: The Client Monitor applet automatically issues a request to the Delivery subcomponent of the Server Siphon. As the presenter moves through the application using their own browser, the Page Capture component places the resulting output of the presenter's actions into the Delivery component. The Delivery component returns the output to each of the pending requests generated by the audience members. It should also be noted that audience members may join the presentation at any time as the Delivery component will deliver the most recently generated output. If this output is waiting at the time of connection, it will be delivered immediately.

Step 3 continues until the presentation is complete. The presenter is free to move through the application as the audience interest dictates.

It is important to note that the system 100 is non-intrusive to the application in the sense that the application does not need to be modified in order for the presentation to be delivered. This is important in saving development costs as the application only needs to be developed to its end requirements without consideration for the presentation. Being non-intrusive is even more important in the case of an attempt to sell an application and its feature sin that the audience is seeing the application in its pure form and as they will be using it.

The scope of the invention is not to be restricted, therefore, to the specific embodiment, and it is intended that the appended claims cover any and all such applications, modifications, and embodiments within the scope of the present invention.

What is claimed is:

1. A system for making presentations to audience clients in a computer network, each audience client having a browser for linking to the network, the system comprising:
   a receiver for receiving and processing at least one page request for at least one requested page from at least one presenter client;
   a transmitter for transmitting the at least one requested page to the presenter client; and
   a server siphon for intercepting the at least one requested page and sending copies of each of the at least one requested page to the at least one connected audience client in response to a generic request from the audience client and in response to the transmitting of the at least one requested page, wherein the generic request does not identify the at least one requested page and wherein the at least one requested page is specified by the at least one page request.

2. The system of claim 1 further comprising means for transmitting to the audience clients an echo of the requested page before the page requested is processed by the receiver.

3. The system of claim 1 comprising means for sending a plug-in software module to each audience client, wherein the plug-in software module requires the client browser to operate under a set of architectural requirements.

4. The system of claim 1 further comprising means for sending a Java applet to each audience client, wherein the Java applet is for executing as an integral part of the audience client browser and includes instructions for continuously sending page requests to the server and for receiving responses to said pages to be displayed on the audience client browser.

5. The system of claim 1, wherein the computer network operates under the Internet protocol.

6. The system of claim 1, wherein the computer network comprises a plurality of nodes operating under the Hypertext Markup Protocol (HTTP), and wherein the audience clients' browsers operate under the HTTP.

7. A method for making presentations over a computer network comprising at least one presenter client and at least one audience client, by the at least one presenter client, each client having a browser, comprising the server steps of:
   receiving at least one page request for at least one requested Web page from the presenter;
   transmitting the at least one requested Web page requested by the presenter to the browser of the presenter; and
   intercepting the requested Web page transmitted and transmitting copies of the Web page to at least one audience client connected to the server in response to receiving a generic request from the audience client and in response to the transmitting of the at last one requested page, wherein the generic request does not identify the at least one requested page and wherein the at least one requested page is specified by the at least one page request.

8. A computer readable medium comprising instructions that include instructions for:
   receiving at least one page request for at least one requested Web page from the presenter;
   transmitting the at least one requested Web page requested by the presenter to the browser of the presenter; and
   intercepting the requested Web page transmitted and transmitting copies of the Web page to at least one audience client connected to the server in response to receiving a generic request from the audience client and in response to the transmitting of the at least one requested page, wherein the generic request does not identify the at least one requested page and wherein the at least one requested page is specified by the at least one page request.

9. The medium of claim 8 further comprising an adjunct library accessing a network server's application program interface.

10. The medium of claim 8 wherein the medium is integrated with a network server.

11. The medium of claim 8 further comprising a storage area within a hard disk drive.

12. The medium of claim 8 further comprising a removable information storage medium storing the program instructions.

13. A computer readable medium comprising program instructions for:

receiving a page request from at least one presenter client;

sending a page to the presenter client, responsive to the page request;

intercepting the page sent to the presenter client;

continually receiving generic requests for successive pages from at least one audience client; and sending copies of the page to each requesting audience client responsive to each pending audience client page generic request and responsive to the intercepting of the page set to the presenter client, wherein the generic request does not identify the at least one page and wherein the page is specified by the presenter client.

14. The system of claim 1 further comprising a client monitor for receiving one of the copies of the requested page from the server siphon and for transmitting, in response to receiving the one of the copies of the page to the server siphon a request for a next page.

15. The system of claim 1, wherein the generic request is transmitted without intervention by a user.

* * * * *